US011983081B1

(12) United States Patent
Krishna et al.

(10) Patent No.: US 11,983,081 B1
(45) Date of Patent: May 14, 2024

(54) ORCHESTRATION OF CONTAINER FAILOVER BETWEEN NODES OF A CLUSTER

(71) Applicant: Dell Products, L.P., Hopkinton, MA (US)

(72) Inventors: Vimal Krishna, Bangalore (IN); Sridharan Kuppuswamy, Bangalore (IN); Shantanu Joshi, Bangalore (IN); Viveka Narendra, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 78 days.

(21) Appl. No.: 17/987,940

(22) Filed: Nov. 16, 2022

(51) Int. Cl.
*G06F 11/20* (2006.01)
(52) U.S. Cl.
CPC ...... *G06F 11/2025* (2013.01); *G06F 11/2046* (2013.01); *G06F 2201/85* (2013.01)
(58) Field of Classification Search
CPC .......................... G06F 11/2046; G06F 2201/85
USPC ...................................................... 714/4.11
See application file for complete search history.

(56) References Cited

U.S. PATENT DOCUMENTS

| | | | | |
|---|---|---|---|---|
| 10,768,973 | B1* | 9/2020 | Jin | ........................ G06F 16/178 |
| 2019/0163405 | A1* | 5/2019 | Israni | .................... G06F 3/0659 |
| 2020/0034193 | A1* | 1/2020 | Jayaram | ................ G06F 3/0644 |
| 2022/0092024 | A1* | 3/2022 | Kavaipatti Anantharamakrishnan | ................. G06F 16/125 |
| 2022/0188277 | A1* | 6/2022 | Powell | .................... G06F 16/18 |
| 2022/0229605 | A1* | 7/2022 | Degwekar | ............. G06F 3/0604 |

FOREIGN PATENT DOCUMENTS

| | | | |
|---|---|---|---|
| CN | 113608840 A | * 11/2021 | |
| WO | WO-2023212228 A1 | * 11/2023 | .......... G06F 11/1451 |

* cited by examiner

*Primary Examiner* — Chae M Ko
(74) *Attorney, Agent, or Firm* — Anderson Gorecki LLP (57) ABSTRACT

Failover of a Docker container between nodes of a cluster is orchestrated to enable the Docker container's data to be made available across all nodes of the cluster. Using this orchestration system, if a second cluster node is selected to be used to bring up a Docker container, the orchestration system coordinates destroying the previous Docker volumes on the first cluster node, unmounting a physical device containing the application data from the first cluster node's virtual filesystem, remounting the physical device containing the application data in the virtual filesystem of the second cluster node, creating a Docker volume referencing the application data on the second cluster node, and using the Docker volume to start a new instance of the Docker container on the second cluster node. This enables the Docker container to be started on any node of a cluster and have the application data available as a local filesystem.

20 Claims, 7 Drawing Sheets

FIG. 4B
(Time = T2)

FIG. 4A
(Time = T1)

ORCHESTRATION OF CONTAINER FAILOVER BETWEEN NODES OF A CLUSTER

FIELD

This disclosure relates to computing systems and related devices and methods, and, more particularly, to orchestration of container failover between nodes of a cluster.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Containers, such as Docker containers, are portable and standalone application software. Containers are deployed on a host Operating System (OS) and continue to run on these hosts. If a user wants to send a command to the container, the user can execute the command from the host. Unlike Virtual Machines, containers do not require separate Operating Systems. Multiple containers can be hosted on a single OS. Although some embodiments will be described in which the containers are implemented using Docker containers, it should be understood that other forms of containers can be used as well depending on the implementation.

In some embodiments, Docker containers are used on a cluster to implement an application providing services on the cluster. If a cluster node fails, or if it is otherwise desirable to move the docker container from a first cluster node to a second cluster node, it would be advantageous to enable the docker container to be shut down on the first cluster node, and restarted on the second cluster node, while enabling the application executing in the container to access its data utilizing a local filesystem.

According to some embodiments, a method and apparatus of orchestrating failover of a Docker container between nodes of a cluster enables the Docker container's data to be made available across all nodes of the cluster. Using this orchestration system, if a second cluster node is selected to be used to bring up a Docker container, the orchestration system coordinates destroying the previous Docker volumes on the first cluster node, unmounting a physical device containing the application data from the first cluster node's virtual filesystem, remounting the physical device containing the application data in the virtual filesystem of the second cluster node, creating a Docker volume referencing the application data on the second cluster node, and using the Docker volume to start a new instance of the Docker container on the second cluster node. This enables the Docker container to automatically be started on any node of a cluster, and to have the application data available to the Docker container as a local filesystem. By presenting the application data as a local filesystem, it is possible to avoid use of a clustered filesystem or network share, both of which typically exhibit increased performance overhead when compared to a local filesystem. Further, unlike a some cluster frameworks such as Kubernetes (K8s) and Docker Swarm (Docker's orchestration tool), according to some embodiments the orchestration system can be implemented on a two-node cluster, whereas K8s and Docker Swarm clusters require a minimum of three nodes.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
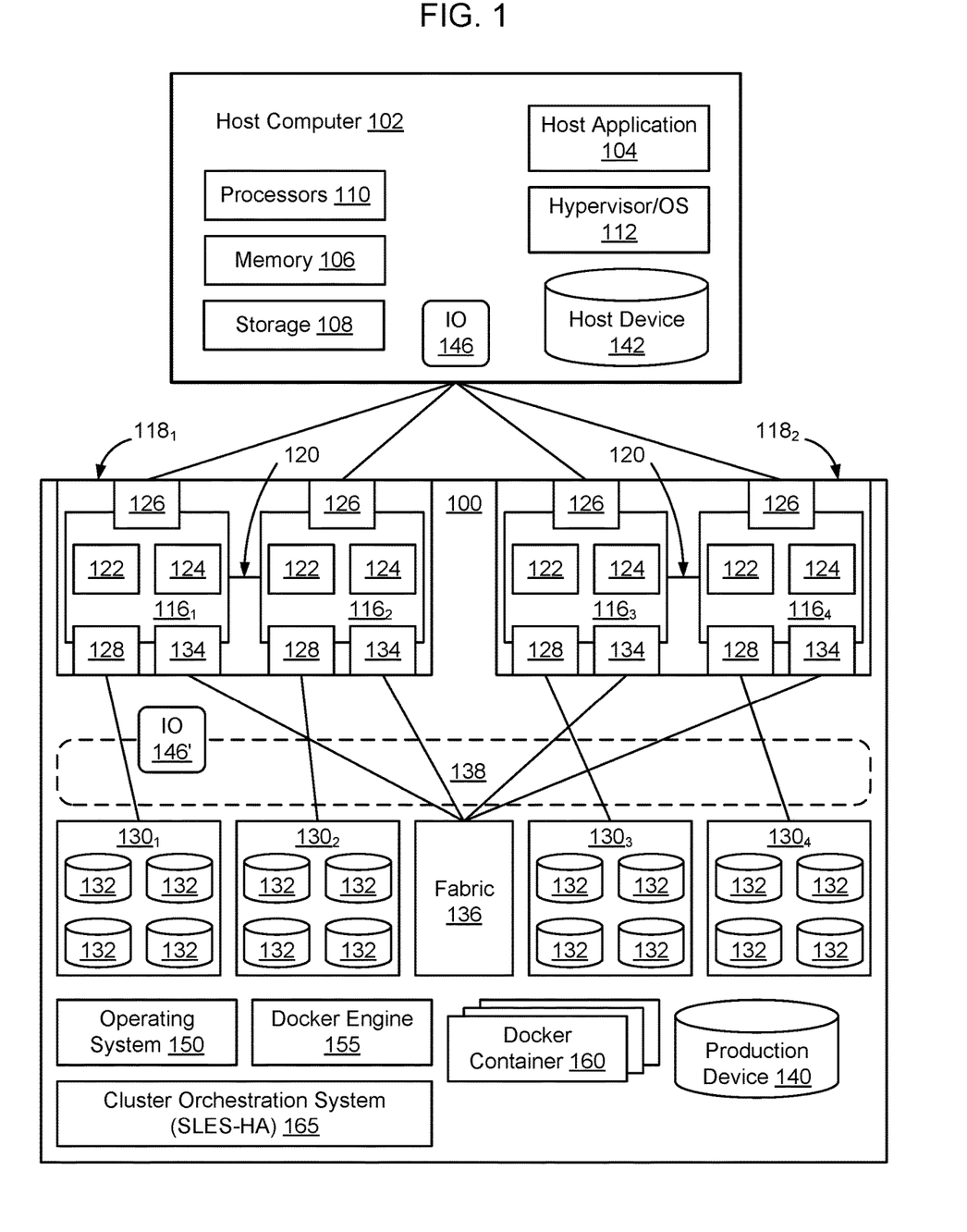
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

As shown in FIG. 1, in some embodiments the storage system 100 includes a container engine 155, an example of which is a Docker engine. The container engine 155 supports creation of containers 160. As used herein, the term "container" is used to refer to a discrete environment set up within an operating system in which one or more applications may be run. A container includes the software, libraries, and set of configuration files to enable the software to execute in the context of the operating system. Containers are packages of software that contain all of the necessary elements to run in any environment. Containers thus enable applications to run in self-contained environments on a host computer. Although some embodiments will be described herein in which the containers that are created are Docker containers, it should be understood that other forms of containers may be used as well, depending on the implementation.

Figure 2:
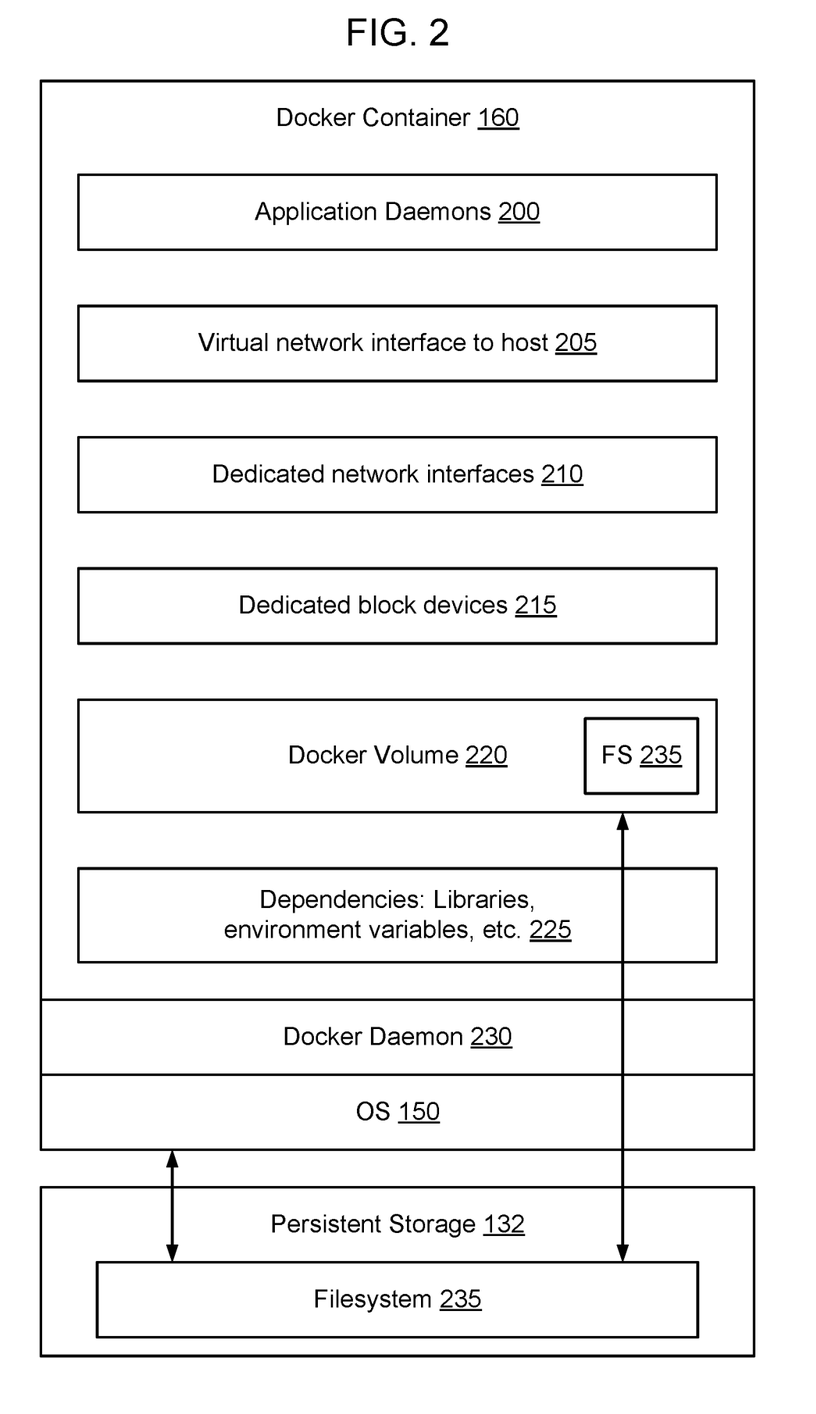
FIG. 2 is a functional block diagram of an example container, according to some embodiments.

FIG. 2 is a functional block diagram of an example container 160, according to some embodiments. As shown in FIG. 2, unlike a virtual machine, a container does not have its own operating system but rather runs on top of the host operating system 150. A Docker daemon 220 (persistent process) executes on the operating system 150 to enable the Docker container 160 to be implemented on the operating system 150.

In some embodiments a Docker image is created that includes one or more applications that should execute in the container 160. A Docker container image is a lightweight, standalone, executable package of software that includes everything needed to run an application: code, runtime, system tools, system libraries and settings. Container images become containers at runtime. In the case of Docker containers, Docker images become containers when they run on the Docker Engine 155.

The Docker container 160 contains application code which, when executing, are implemented using application daemons 220. The Docker container 160 also includes one or more virtual network interfaces to the host 205 and may include one or more dedicated network interfaces 210. The Docker container 160 may also include one or more dedicated block devices 215 and one or more Docker volumes 220. The Docker container also includes any dependencies 225 required by the application daemons to enable the application to execute within the Docker container. Example dependencies include libraries, environment variables, and other items depending on the implementation. The Docker container is kept alive by a Docker Daemon 230 running in the context of the operating system 150.

A Docker container 160 is based on a Docker image that is stored as a series of read-only layers. When a Docker container 160 is started from a Docker image, the Docker engine 155 takes the read-only image and adds a read-write layer on top. If the running container modifies an existing file, the file is copied out of the underlying read-only layer and into the top-most read-write layer where the changes are applied. The version in the read-write layer hides the underlying file, but does not destroy it—it still exists in the underlying layer. When a Docker container is deleted, relaunching the image will start a fresh container without any of the changes made in the previously running container. Those changes are lost. The combination of read-only layers and read-write layer is referred to herein as a "Union File System."

To persist (save) data and to share data between containers, it is possible to use one or more Docker volumes 220. A Docker volume 220 is a directory or set of files that exists outside of the Docker container Union File System and exist as normal directories and files on the host filesystem. A Docker volume can therefore be thought of as a pointer to a filesystem that has been mounted to a virtual file system maintained by a host operating system.

A Docker container accordingly loses any data/state that it creates or updates within its local filesystem whenever it is restarted or shut down. This is because all changes happen on the writable layer within the container that is only available for the duration of the container's lifetime. To persist the data across container restarts, docker volumes are attached to the container when the container is started, and any file system changes made to the directories mapped to a docker volume are automatically persisted beyond the lifetime of the container.

A challenge arises in the context of a multi-node cluster, where a possibility exists that a Docker container can be spawned at any node of the cluster, either on startup or on restart due to node failures. According to some embodiments, a method and apparatus of orchestrating failover of a Docker container between nodes of a cluster enables the Docker container's data to be made available across all nodes of the cluster. Using this orchestration system, if a second cluster node is selected to be used to bring up a Docker container, the orchestration system coordinates destroying the previous Docker volumes on the first cluster node, unmounting a physical device containing the application data from the first cluster node's virtual filesystem, remounting the physical device containing the application data in the virtual filesystem of the second cluster node, creating a Docker volume referencing the application data on the second cluster node, and using the Docker volume to start a new instance of the Docker container on the second cluster node. This enables the Docker container to automatically be started on any node of a cluster, and to have the application data available to the Docker container as a local filesystem. By presenting the application data as a local filesystem, it is possible to avoid use of a clustered filesystem or network share, both of which typically exhibit increased performance overhead when compared to a local filesystem. Further, unlike a some cluster frameworks such as Kubernetes (K8s) and Docker Swarm (Docker's orchestration tool), according to some embodiments the orchestration system can be implemented on a two-node cluster, whereas K8s and Docker Swarm clusters require a minimum of three nodes.

Figure 3A:
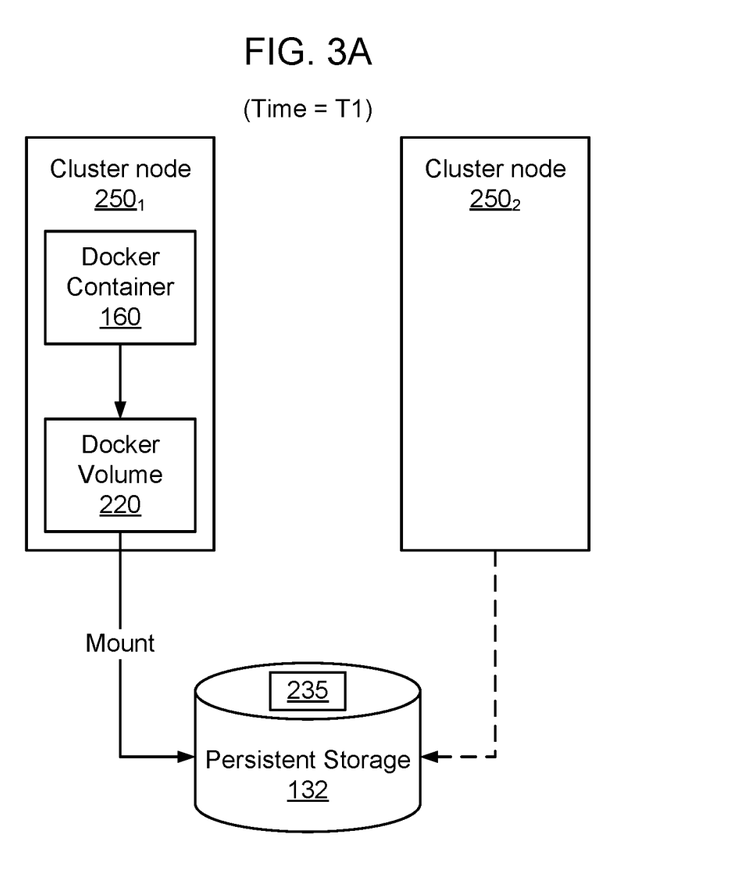
FIG. 3A is a functional block diagram of an example cluster containing two cluster nodes, in which a container has been started on a first cluster node at Time=T1, according to some embodiments.
Figure 3B:
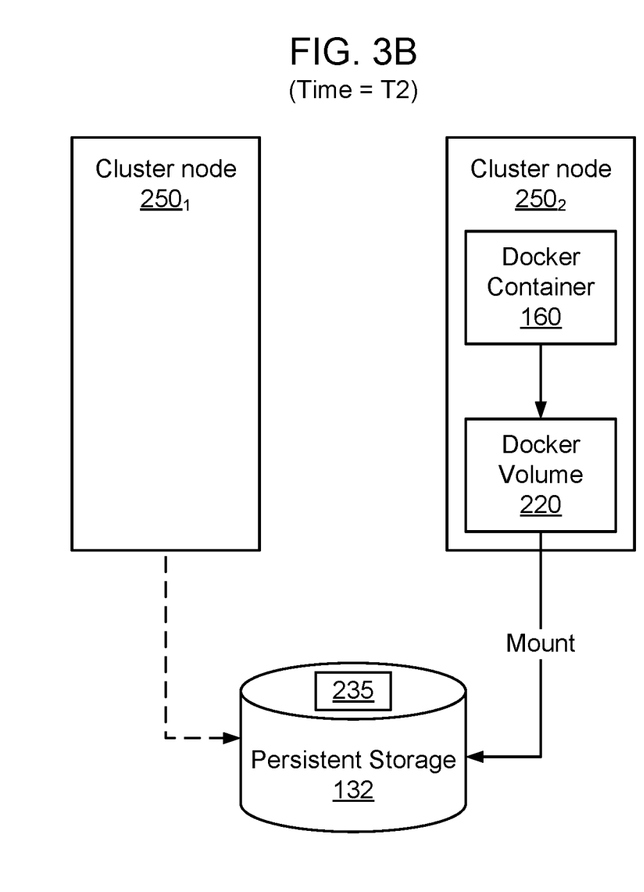
FIG. 3B is a functional block diagram of the example cluster of FIG. 3A containing two cluster nodes, in which the container has been started on a second cluster node at Time=T2, according to some embodiments.

FIG. 3A is a functional block diagram of an example cluster containing two cluster nodes $250_1$, $250_2$, in which a container has been started on a first cluster node $250_1$ at Time=T1, according to some embodiments. FIG. 3B is a functional block diagram of the example cluster of FIG. 3A containing two cluster nodes $250_1$, $250_2$, in which the container has been shut down on the first cluster node $250_1$ and re-started on a second cluster node $250_2$ at Time=T2, according to some embodiments. In FIGS. 3A and 3B, the two cluster nodes are implemented on separate storage engines 116 that both have physical access to the same block device 132. For example, in some embodiments, the persistent storage is implemented on one or more of the managed devices 132 of one or more of the storage arrays 130.

According to some embodiments, because the persistent storage 132 is physically shared between cluster nodes $250_1$, $250_2$, it is possible for the application file systems 235 that are physically stored on the persistent storage 132 to be mounted to the operating system of the first storage engine 116 supporting the first cluster node $250_1$. A docker volume 220 can then be created and used to start the Docker container 160 on the first cluster node $250_1$.

When failover is initiated, the cluster orchestration system 165 brings down the Docker container 160 on the first cluster node $250_1$ that is using the application filesystems. The cluster orchestration system 165 then deletes the docker volumes 220 on the first cluster node $250_1$, but keeps the application filesystems 235 that were referenced by the docker volumes 220 on persistent storage 132. The cluster orchestration system 165 also unmounts the application filesystems 235 from the first cluster node $250_1$.

As shown in FIG. 3B, the orchestration system then mounts the application filesystems 235 to the virtual filesystem of the second cluster node $250_2$, creates docker volumes referencing the mounted application filesystems, and uses the docker volumes to start docker container 160 on the second cluster node. By mounting the disk on the second cluster node $250_2$, that is responsible for hosting the container, it is possible to create new docker volumes, using the data from the mounted disk on the second container node, and then bring up the new container on the second cluster node using the volumes from the disk. Accordingly, the new container on the second cluster node $250_2$ can access the data that was created by the previous container instance $250_1$. Although some embodiments are described in which the cluster nodes are implemented on storage engines 116 of a given storage system 100, it should be understood that the storage engines 116 might be remotely located, and the solution described herein can be broadly implemented in any situation where two cluster nodes are able to obtain physical access to the same volume of persistent storage 132.

Figure 4A:
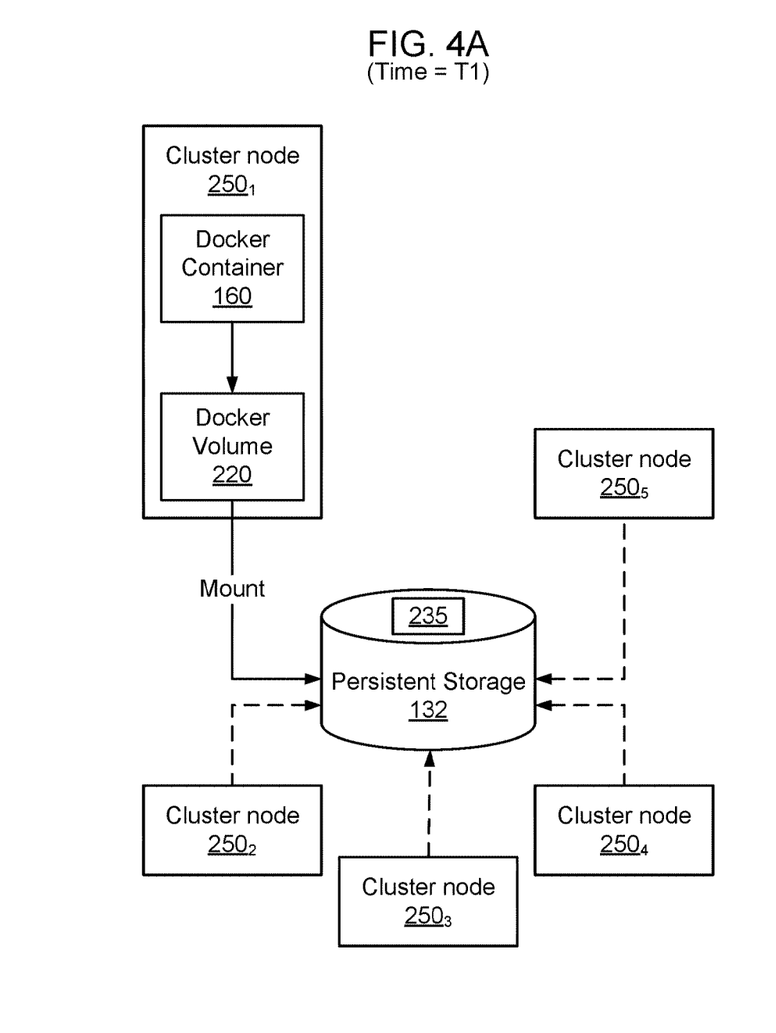
FIG. 4A is a functional block diagram of an example cluster containing multiple cluster nodes, in which a container has been started on a first cluster node at Time=T1, according to some embodiments.
Figure 4B:
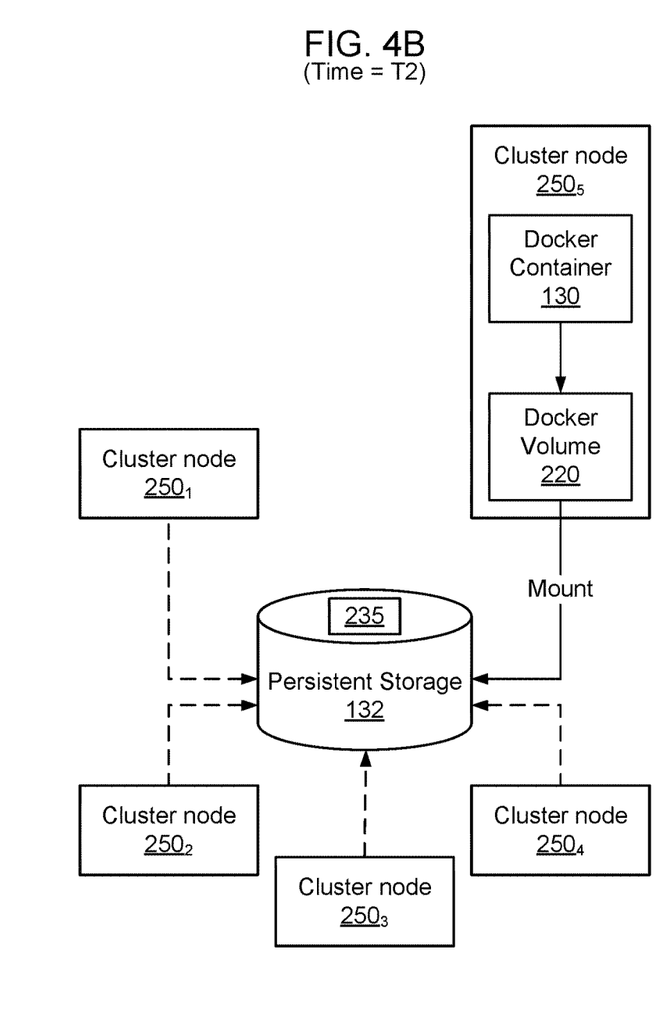
FIG. 4B is a functional block diagram of the example cluster of FIG. 4A containing multiple cluster nodes, in which the container has been started on a different cluster node at Time=T2, according to some embodiments.

The process described in connection with FIGS. 3A and 3B can similarly be used in connection with a cluster that has multiple cluster nodes. For example, FIG. 4A is a functional block diagram of an example cluster containing multiple cluster nodes, in which a container has been started on a first cluster node $250_1$ at Time=T1, according to some embodiments. FIG. 4B is a functional block diagram of the example cluster of FIG. 4A containing multiple cluster nodes, in which the container has been re-started on a different cluster node 2505 at Time=T2, according to some embodiments.

As shown in FIGS. 4A and 4B, if two or more nodes of a given cluster have the ability to concurrently or sequentially obtain physical access to the same volume of persistent storage 132, by storing the application filesystems 235 on the shared persistent storage, it is possible to sequentially mount and unmount the application filesystems to different cluster nodes. Once the application filesystem 235 has been mounted to a selected cluster node, one or more docker volumes can be created from the mounted application filesystems, and used to start a Docker container on the selected cluster node. In this manner it is possible move Docker containers within a cluster without using a shared filesystem such as NFS, and without using a cluster-aware filesystem. Rather, a local filesystem is able to be used to implement each instance of the Docker container regardless of which node is used to start the Docker container, thus providing the enhanced performance associated with enabling the application executing inside the Docker container to access its filesystems as local filesystems.

Figure 5:
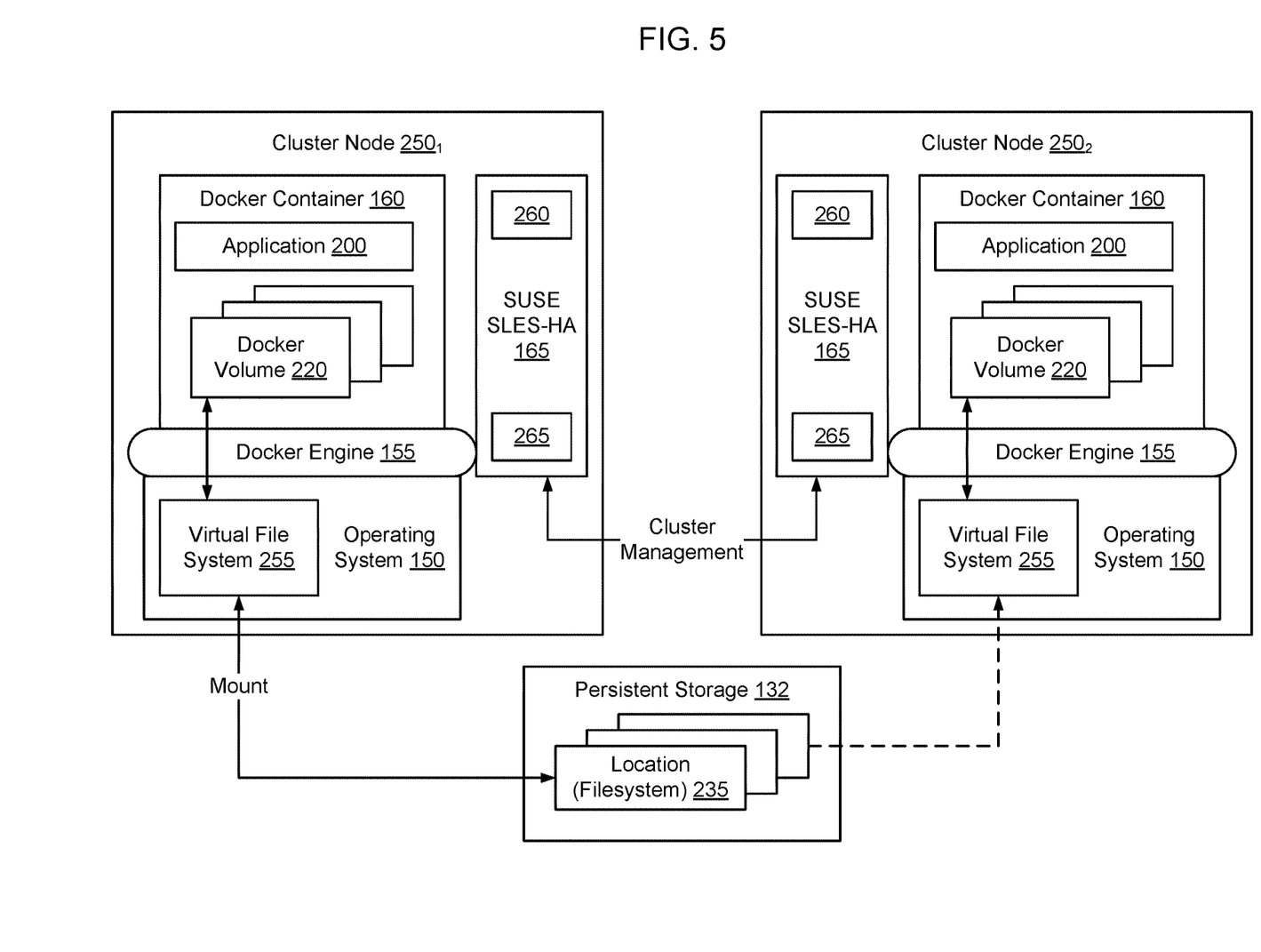
FIG. 5 is a functional block diagram of an example cluster containing two cluster nodes in greater detail, according to some embodiments.

FIG. 5 is a functional block diagram of an example cluster containing two cluster nodes and showing the orchestration components in greater detail, according to some embodiments. As shown in FIG. 5, in some embodiments the storage engine $116_1$ has an operating system 150. An example operating system may be SuSE™ (Software and System-Entwicklung) Linux Enterprise Server (SLES-15), although other operating systems may be used as well. An orchestration system 165 is used to manage the cluster nodes and to manage failover of containers between nodes of the cluster. In some embodiments SuSE Linux High Availability Extension (SUSE SLES-HA) is used to implement the orchestration system 165. The orchestration system 165 is used to implement highly available physical and virtual Linux clusters. In some embodiments, the orchestration system includes monitoring, messaging, and cluster management functionality, supporting failover, failback, and migration (load balancing) of individually managed cluster resources.

In some embodiments, the SLES HA 165 is configured to determine where a resource/docker container can run. The SLES HA 165 includes scripts to mount/unmount the shared persistent storage 132 to the correct cluster node 250. When the shared persistent storage 132 is mounted to a cluster node 250, it becomes a resource of the cluster node that is managed by the SLES HA 165 on the cluster node. The SLES HA also contains scripts to create/delete docker volumes that are mapped to the shared persistent storage. As docker volumes are created they become resources to be managed by the SLES HA on the cluster node.

As an example, assume that an application "app1" has a data partition that is located at/dev/nvme1/app1/data. When a cluster node $250_1$ is selected to implement a container in which app1 will execute, orchestration system 165 runs a mount management script 260 to cause the location of persistent storage 132 to be mounted to the virtual filesystem 255 of the operating system 150 on cluster node $250_1$. For example, the command "mount" can be used to add the data partition that is located at /dev/nvme1/app1/data to the virtual file system 255 at a mountpoint within the virtual file system. The filesystems 235 that are maintained on persistent storage 132 accordingly become available on the first cluster node $250_1$ at the selected mountpoint. In this example, it will be assumed that the selected mountpoint is "volume_6:/dev/nvme1/app1/data."

A docker volume management script 265 is then used to create one or more docker volumes from the mountpoint. For example, the command "docker volume create" can be used from the script 265 to create one or more Docker volumes from the mountpoints where the locations of persistent storage 132 that were added to the virtual file system.

Once the Docker volumes have been created, a Docker container can be started, for example using the command "docker run -d -v volume_6:/dev/nvme1/app1/data."Note that the -v command is used, in this instance, to specify that the Docker container should include the Docker volume "volume 6:/devinvme1/app1/data."

It should be understood that a given container might require multiple Docker volumes. In some embodiments, creation of the required set of Docker volumes is implemented by the orchestration system 165. For example, in some embodiments the orchestration system 165 reads the name of the application that will be implemented in the container that is to be started, and reads a config file for the application to determine a list of docker volumes that are to be created. For each persistent location specified in the config file, the orchestration system 165 uses the mount management script 260 to mount the persistent location to the virtual file system, and then uses the docker volume management script 265 to create a corresponding docker volume 220. Once the required set of docker volumes has been created, the container is brought online using the set of required docker volumes. An example orchestration process showing creation of a set of docker volumes is described in greater detail herein in connection with FIG. 7.

Figure 6:
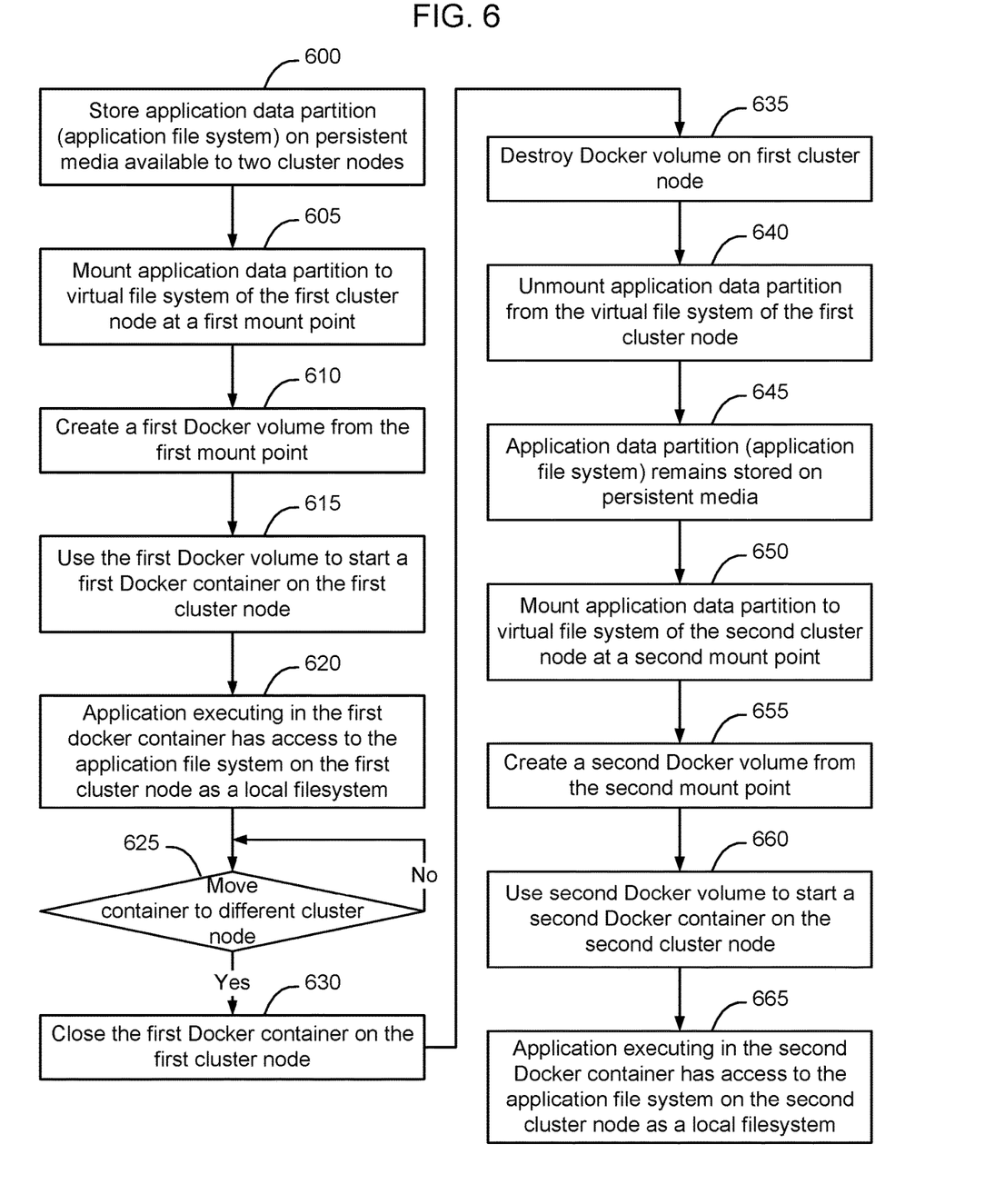
FIG. 6 is a flow chart of an example process of orchestrating container failover between nodes of a cluster, according to some embodiments.

FIG. 6 is a flow chart of an example process of orchestrating container failover between nodes of a cluster, according to some embodiments. As shown in FIG. 6, in some embodiments, application data such as a file system that is required to be accessed by an application that will execute in a container is stored in a data partition on persistent media that is available to at least two nodes of a cluster (block 600). As used herein, the term "available" is used to identify the persistent media as being able to be accessed by each of the nodes. It should be understood that at most one node will mount the persistent media to provide access the application data at a mountpoint at any given point in time.

The application data partition is mounted to a virtual file system of a first cluster node at a first mount point (block 605). A first Docker volume is created from the first mount point (block 610) and used to start a first Docker container on the first cluster node (block 615). The first Docker container thus has access to application file system on first cluster node (block 620) as a local filesystem.

A determination is then made whether to move the container to a different cluster node (block 625). Movement of a container within a cluster may be due to failure of the first cluster node, for load balancing to spread workload more evenly between the cluster nodes, or for many other reasons. While the container is not moved (a determination of NO at block 625) the application executes within the Docker container on the first cluster node.

When a decision is made to move the Docker container to a second cluster node (a determination of YES at block 625), the Docker container is closed (block 630) and the Docker volume is destroyed (block 635). The application data partition is also unmounted from the virtual file system of the first cluster node (block 640). Removing the filesystem from the first cluster node is important, because since the filesystem is not cluster aware, mounting the filesystem on multiple nodes simultaneously can lead to corruption.

In instances where movement of the Docker container is due to a failure of the first cluster node, optionally some of the processes associated with closing the Docker container and destroying the Docker volume may occur automatically in connection with the failure of the first cluster node. In instances where the cluster node fails, in some embodiments the orchestration script is configured to implement the unmount process of block 635 in connection with reboot of the cluster node to ensure that the rebooted cluster does not include the application data partition in its virtual file system after completion of the reboot process.

While the Docker container, Docker volume, and mountpoint are being cleaned up on the original cluster node, the application data partition (application file system) remains physically stored in persistent media (block 645). The orchestration script selects a second cluster node for the container, and causes the application data partition to be mounted to virtual file system of the second cluster node at a second mount point (block 650). A second Docker volume is created from the second mount point (block 655) and the second Docker volume is used to start the second Docker container on the second cluster node (block 660). In this manner the second Docker container, on the second cluster node, has access to the application file system as a local file system, that was also originally accessed by the first Docker container on the first cluster node as a local file system (block 665).

Figure 7:
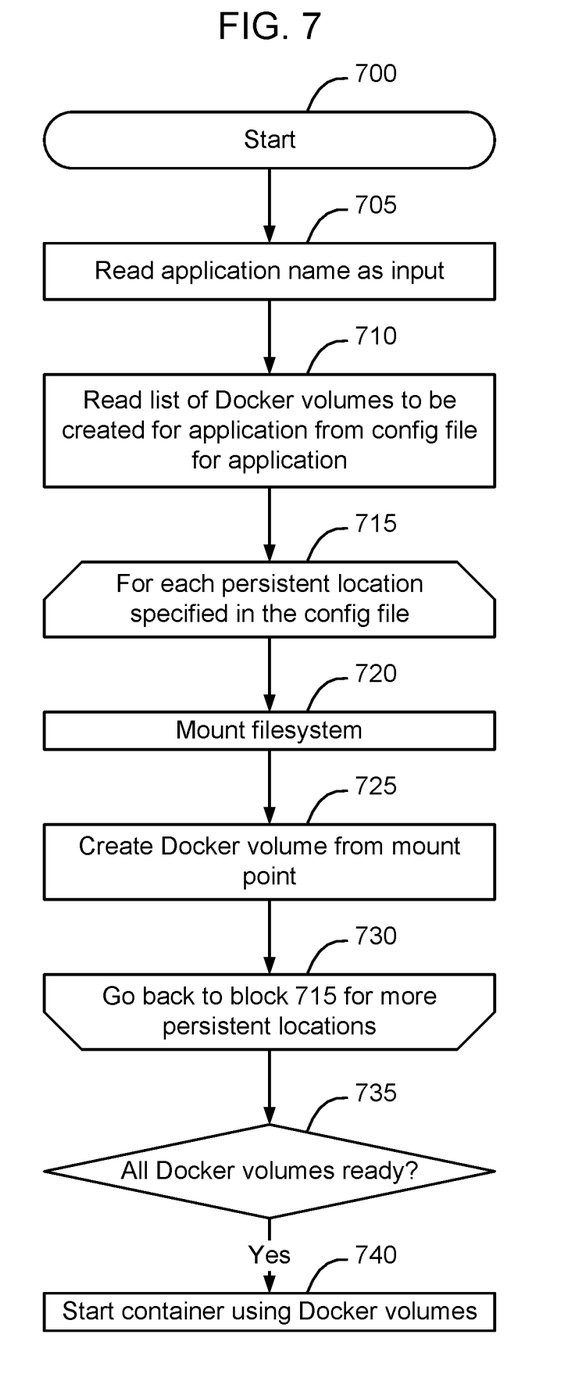
FIG. 7 is a flow chart of an example process of creating a set of Docker volumes from a set of locations in one or more persistent storage volumes, according to some embodiments.

FIG. 7 is a flow chart of an example process of creating a set of Docker volumes from a set of locations in one or more persistent storage volumes, according to some embodiments. When a decision is made to start an application in a Docker container (block 700), if the application is already running in a different container, the process described in connection with FIG. 6, blocks 625-640 is used to stop execution of the application on the first cluster node.

On the cluster node where the Docker container is to be started, in some embodiments the orchestration script reads, as input, the name of the application that is to be started in a Docker container (block 705). The application name is used to access a config file for the application, and in some embodiments the orchestration script reads a list of Docker volumes that is to be created for the application from the application config file (block 710). An application may need as few as one Docker volume, tens of Docker volumes, or more Docker volumes depending on the implementation.

For each persistent location specified in the config file (block 715), the orchestration script mounts the filesystem contained at the persistent location to the cluster node's virtual file system (block 720), and creates a Docker volume from the mount point (block 725). After processing a given persistent location, the orchestration process goes back and iterates the processes described in blocks 720 and 725 for each persistent location required to be accessed by the application (block 730). A determination is then made whether all Docker volumes are ready (block 735). When all Docker volumes are ready (a determination of YES at block 735), the orchestration script starts a Docker container using the Docker volumes (block 740).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of orchestrating movement of a container between cluster nodes, comprising:
   mounting a volume of persistent memory at a first mountpoint in a first virtual filesystem of a first cluster node, the volume of persistent memory containing an application data partition containing an application filesystem;
   creating a first Docker volume from the first mountpoint on the first cluster node;
   starting a first Docker container containing an application on the first cluster node using the first Docker volume to make the application filesystem available to the application in the first Docker container;
   closing the first Docker container on the first cluster node;
   destroying the first Docker volume on the first cluster node;
   unmounting the volume of persistent memory from the first virtual filesystem of the first cluster node;
   mounting the volume of persistent memory at a second mountpoint in a second virtual filesystem of a second cluster node, the volume of persistent memory containing the application data partition containing the application filesystem;
   creating a second Docker volume from the second mountpoint on the second cluster node; and
   starting a second Docker container containing the application on the second cluster node using the second Docker volume to make the application filesystem available to the application in the second Docker container.

2. The method of claim 1, wherein the first Docker container is created from a first Docker image, and wherein the second Docker container is created from the first Docker image.

3. The method of claim 1, wherein the application data partition remains stored on the volume of persistent memory after closing the first Docker container on the first cluster node and after unmounting the volume of persistent memory from the first virtual filesystem of the first cluster node.

4. The method of claim 1, wherein starting the first Docker container causes the application to execute in the first Docker container.

5. The method of claim 4, wherein the application filesystem is available to the executing application in the first Docker container as a local filesystem on the first cluster node.

6. The method of claim 5, wherein starting the second Docker container causes the application to execute in the second Docker container.

7. The method of claim 6, wherein the application filesystem is available to the executing application in the second Docker container as a local filesystem on the second cluster node.

8. The method of claim 1, further comprising determining that the first Docker container should be moved from the first cluster node to the second cluster node; and
   in response to determining that that the first Docker container should be moved from the first cluster node to the second cluster node, using a cluster management system to orchestrate the movement of the container between the cluster nodes.

9. The method of claim 1, wherein the cluster management system includes scripts to coordinate unmounting the volume of persistent storage from the first virtual filesystem of the first cluster node before mounting the volume of persistent storage to the second virtual filesystem of the second cluster node to prevent the volume of persistent storage from being mounted to both the first virtual filesystem and to the second virtual filesystem at the same time.

10. The method of claim 1, wherein the volume of persistent memory is a tangible persistent storage component.

11. A system for orchestrating movement of a container between cluster nodes, comprising:
   one or more computers and one or more storage devices storing instructions that are operable, when executed by the one or more computers, to cause the one or more computers to perform operations comprising:
   mounting a volume of persistent memory at a first mountpoint in a first virtual filesystem of a first cluster node, the volume of persistent memory containing an application data partition containing an application filesystem;
   creating a first Docker volume from the first mountpoint on the first cluster node;
   starting a first Docker container containing an application on the first cluster node using the first Docker volume to make the application filesystem available to the application in the first Docker container;
   closing the first Docker container on the first cluster node;
   destroying the first Docker volume on the first cluster node;
   unmounting the volume of persistent memory from the first virtual filesystem of the first cluster node;
   mounting the volume of persistent memory at a second mountpoint in a second virtual filesystem of a second cluster node, the volume of persistent memory containing the application data partition containing the application filesystem;

creating a second Docker volume from the second mountpoint on the second cluster node; and starting a second Docker container containing the application on the second cluster node using the second Docker volume to make the application filesystem available to the application in the second Docker container.

12. The system of claim 11, wherein the first Docker container is created from a first Docker image, and wherein the second Docker container is created from the first Docker image.

13. The system of claim 11, wherein the application data partition remains stored on the volume of persistent memory after closing the first Docker container on the first cluster node and after unmounting the volume of persistent memory from the first virtual filesystem of the first cluster node.

14. The system of claim 11, wherein starting the first Docker container causes the application to execute in the first Docker container.

15. The system of claim 14, wherein the application filesystem is available to the executing application in the first Docker container as a local filesystem on the first cluster node.

16. The system of claim 15, wherein starting the second Docker container causes the application to execute in the second Docker container.

17. The system of claim 16, wherein the application filesystem is available to the executing application in the second Docker container as a local filesystem on the second cluster node.

18. The system of claim 11, further comprising instructions that are operable, when executed by the one or more computers, to cause the one or more computers to perform operations comprising:

determining that the first Docker container should be moved from the first cluster node to the second cluster node; and in response to determining that that the first Docker container should be moved from the first cluster node to the second cluster node, using a cluster management system to orchestrate the movement of the container between the cluster nodes.

19. The system of claim 11, wherein the cluster management system includes scripts to coordinate unmounting the volume of persistent storage from the first virtual filesystem of the first cluster node before mounting the volume of persistent storage to the second virtual filesystem of the second cluster node to prevent the volume of persistent storage from being mounted to both the first virtual filesystem and to the second virtual filesystem at the same time.

20. The system of claim 11, wherein the volume of persistent memory is a tangible persistent storage component.

* * * * *